United States Patent [19]

Sansone

[11] Patent Number: 4,666,996
[45] Date of Patent: May 19, 1987

[54] CROSSLINKING OF POLYBENZIMIDAZOLE POLYMER WITH DIVINYL SULFONE

[75] Inventor: Michael J. Sansone, Berkeley Heights, N.J.

[73] Assignee: Celanese Corporation, New York, N.Y.

[21] Appl. No.: 822,088

[22] Filed: Jan. 24, 1986

[51] Int. Cl.$^4$ .............................................. C08G 73/18
[52] U.S. Cl. ................................... 525/426; 525/435; 525/540
[58] Field of Search ....................... 525/426, 435, 540

[56] References Cited

U.S. PATENT DOCUMENTS 3,408,336 10/1968 Benson ................................. 525/435
4,020,142 4/1977 Davis et al. ......................... 525/435
4,579,915 4/1986 Choe ................................... 525/435

Primary Examiner—Harold D. Anderson
Attorney, Agent, or Firm—Lynch, Cox & Gilman

[57] ABSTRACT

Disclosed herein is a process for crosslinking polybenzimidazole polymers which comprise reacting said polymers with a divinylsulfone in the presence of a strong base catalyst.

20 Claims, No Drawings

CROSSLINKING OF POLYBENZIMIDAZOLE POLYMER WITH DIVINYL SULFONE

BACKGROUND OF INVENTION

1. Field of Invention

This invention relates to polybenzimidazole polymers. More particularly, the invention relates to the crosslinking of polybenzimidazole polymers.

2. Prior Art

The crosslinking of polybenzimidazole is known in the art. In U.S. Pat. No. 4,020,142, a process for chemically modifying polybenzimidazole membranes to increase the toughness of the membrane is disclosed. Imidazole groups of the polybenzimidazole membrane are crosslinked by the addition of a polybasic acid or an acid chloride. When an acid chloride is utilized, the polybenzimidazole tends to be covalently crosslinked through an amide-type linkage.

In U.S. Pat. No. 4,154,919, another process is disclosed for preparing crosslinked polybenzimidazole. The process involves the reaction of a tetracarboxylic acid dianhydride crosslinking agent with a tetraamine and dicarboxylic anhydride.

Accordingly, it is an object of the present invention to provide a novel process for the crosslinking of polybenzimidazoles.

It is a further object of this invention to prepare crosslinked polybenzimidazoles that will enhance the mechanical properties of polybenzimidazole membranes and other products.

These and other objectives are obtained by preparing the compositions of the present invention.

SUMMARY OF INVENTION

The present invention involves a novel process for the crosslinking of polybenzimidazole by reacting the polymer with a divinylsulfone in the presence of a base catalyst. The resulting products posess improved mechanical properties and expanded usefulness as membranes in comparison to prior art polybenzimidazole membranes. In addition, the compositions of the instant invention are particularly useful as ion exchange resins.

DETAILED DESCRIPTION OF INVENTION

A. The Starting Material

The polymeric material used in the present invention is a linear polybenzimidazole. Polybenzimidazoles are a known class of heterocyclic polymers. Typical polymers of this class and their preparation are more fully described in U.S. Pat. No. 2,895,948, U.S. Pat. No. RE. 26,065, and in the Journal of Polymer Science, Vol. 50, pages 511-539 (1961) which are herein incorporated by reference. The polybenzimidazoles consist essentially of recurring units of the following Formulas I and II. Formula I is:

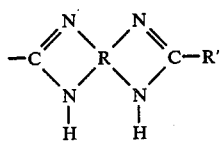

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

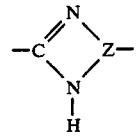

wherein Z is an aromatic nucleus having the nitrogen atoms forming the benzimidazole ring paired upon adjacent carbon atoms of the aromatic nucleus.

Preferably, aromatic polybenzimidazoles are selected from polymers consisting essentially of the recurring units of Formula I wherein R' is an aromatic ring or a heterocyclic ring and Formula II.

As set forth in U.S. Pat. No. RE. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxylic compound selected from the class consisting of (a) the diphenyl ester of an aromatic dicarboxylic acid, (b) the diphenyl ester of a heteroyclic dicarboxylic acid wherein the carboxyl groups are substituents upon a carbon in a ring compound selected from the class consisting of pyridine, pyrazine, furan, quinoline, thiophene and pyran and (c) an anhydride of an aromatic dicarboxylic acid.

Examples of polybenzimidazoles which have the recurring structure of Formula I are as follows:

poly-2,2'-(m-phenylene)-5,5'-bibenzimidazole;
poly-2,2'-(pyridylene-3",5")-5,5'-bibenzimidazole;
poly-2,2'(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexeneyl-5,5'-bibenzimidazole;
poly-2,2'(m-phenylene)-5,5'-di(benzimidazole) ether;
poly-2,2'(m-phenylene)-5,5'-di(benzimidazole) sulfide;
poly-2,2'(m-phenylene)-5,5'-di(benzimidazole) sulfone;
poly-2,2'(m-phenylene)-5,5'-di(benzimidazole) methane;
poly-2',2"(m-phenylene)-5',5"-di(benzimidazole) propane-2,2;
and poly-2', 2"-(m-phenylene)-5', 5"-di(benzimidazole) ethylene-1,2 where the double bonds of the ethylene groups are intact in the final polymer.

The preferred polybenzimidazole for use in the present process is one prepared from poly-2,2'-(m- phenylene)-5,5'-bibenzimidazole, the recurring unit of which is:

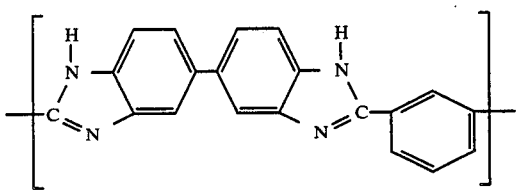

Any polymerization process known to those skilled in the art may be employed to prepare the polybenzimidazole which may then be crosslinked. Representative techniques for preparing the polybenzimidazole are disclosed in U.S. Pat. Nos. 3,509,108, 3,549,603, 3,551,389, 4,312,976, 4,452,971, 4,452,972, 4,483,977 and 4,485,232 which are herein incorporated by reference.

With respect to aromatic polybenzimidazoles, preferably equimolar quantities of the monomeric tetraamine and dicarboxyl compound are introduced into a first stage melt polymerization reaction zone and heated therein at a temperature above about 200° C., preferably at least 250° C., and more preferably from about 270° C. to 300° C. The reaction is conducted in a substantially oxygen-free atmosphere, i.e., below about 20 ppm oxygen and preferably below about 8 ppm oxygen, until a foamed prepolymer is formed having an inherent viscosity, expressed as deciliters per gram, of at least 0.1 and preferably from about 0.13 to 0.3. The inherent viscosity (I.V.) as used herein is determined from a solution of 0.4 grams of the polymer in 100 ml. of 97 percent $H_2SO_4$ at 25° C.

After the conclusion of the first stage reaction, which normally takes at least 0.5 hour and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.4, e.g., 0.8 to 1.1 or more.

The temperature employed in the second stage is at least 250° C., preferably at least 325° C., and more preferably from about 350° to 425° C. The second stage reaction generally takes at least 0.5 hour, and preferably from about 1 to 4 hours or more. It is, of course, also possible to prepare the instant polymers via a one-step reaction. However, the previously-described two-step process is preferred.

B. The Polymer Solution

The solvents utilized to form the polybenzimidazole polymer solutions to which a crosslinking agent is added include those solvents which are commonly-recognized as being capable of dissolving the particular polybenzimidazole polymer. For instance, the solvents may be selected from those commonly utilized in the formation of polybenzimidazole dry spinning solutions. Illustrative examples of suitable solvents include N,N-dimethyl acetamide, N,N-dimethyl formamide, dimethyl sulfoxide, and N-methyl-2-pyrrolidone. The particularly preferred solvent is N,N-dimethyl acetamide. Additional representative solvents include formic acid, acetic acid, and sulfuric acid.

The polymer solutions may be prepared, for example, by dissolving sufficient polybenzimidazole in the solvent to yield a final solution containing from about 4 to 30 percent by weight of polymer based on the total weight of the solution, and preferably from about 10 to 20 percent by weight.

The quantity of polybenzimidazole dissolved in the solvent should be such that the resulting solution has a viscosity of about 50 to 4,000 poise at 30° C., and preferably about 200 to 3000 poise.

One suitable means for dissolving the polymer in the solvent is by mixing the materials at a temperature above the normal boiling point of the solvent, for example, about 25° to 120° C. above such boiling point, and at a pressure of 2 to 15 atmospheres for a period of 1 to 5 hours. The resulting solutions are preferably filtered to remove any undissolved polymer. A minor amount of lithium chloride optionally may be provided in the solution in accordance with the teachings of U.S. Pat. No. 3,502,606. The lithium chloride prevents the polybenzimidazole polymer from phasing out of the solution upon standing for extended periods of time.

C. Crosslinking of Polybenzimidazole

To the above polybenzimidazole solution is added a divinylsulfone which has the following general formula:

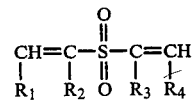

wherein $R_1$–$R_4$ are the same or different and are H or $C_1$–$C_3$ alkyl.

According to the instant invention it is believed that crosslinking occurs via a modified Michael type addition following this general reaction scheme:

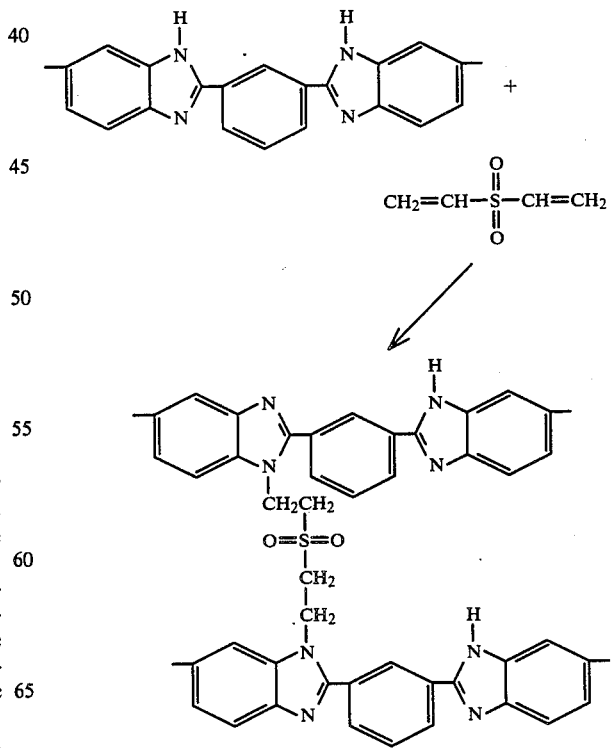

The amount of divinylsulfone which will be added depends upon the degree of crosslinking that is desired. One mole of divinylsulfone is added for each two equivalents of polybenzimidazole amine hydrogen that are desired to be crosslinked.

In order to accelerate the speed of crosslinking, a base catalyst is added to the polymeric solution. Generally, any strong base, i.e., a base which is at least as strong as an alkali metal hydroxide may be employed as the base catalyst. Examples of suitable catalysts include alcohol metal hydroxides such as sodium and potassium hydroxide, alcohol metal alkoxides having from one to six alkyl carbon atoms such as sodium methoxide, sodium ethoxide, and alkyl aryl amine hydroxides such as particularly preferred benzyl trimethyl ammonium hydroxide. The base catalyst is generally added in amounts ranging from about 5 percent to 150 percent based upon the total weight of the divinylsulfone which is added. The preferred range is about 25 to about 50 percent by weight.

The time required to complete the crosslinking reaction depends on a wide variety of factors including the amount of reaction catalyst which is added, the temperature at which the reactants are maintained and the form of the reactants, i.e., solution, film, solid. If no catalyst is employed the reaction time may be as long as one week. Where a catalyst is employed, however, the reaction proceeds rapidly, e.g. 1–4 hours, at room temperature.

The crosslinked polybenzimidazole polymers of the instant invention may be employed to form a wide variety of articles including films, membranes and ion exchange resins. The process for employing the crosslinked polymers may vary. For example, the polymer may be crosslinked thereby forming a gel in situ and the gel filtered or otherwise removed from the solution and subsequently hot pressed into a membrane. In addition, such gel particles may be used as ion exchange resins.

It is also possible, using the compositions of the instant invention, to carry out the crosslinking process after a membrane or film has been partially or totally formed. Crosslinking may occur by spraying, dipping or otherwise coating the film or membrane with the divinylsulfone. Crosslinking of the surface of films or membranes in this fashion will improve the films' or membranes' mechanical properties.

Thus using the process of the instant invention crosslinked polybenzimidazole polymers can be prepared which have improved chemical and mechanical stability. Chemical stability is improved because of the use of a crosslinking agent which is not readily subject to base or acid catalized hydrolysis as are crosslinking agents which employ an amide formation mechanism as the basis for crosslinking. As a result, the range of usefulness of the products prepared according to the instant invention is much broader than are the uses possible with amide crosslinked polybenzimidazoles of the prior art.

The invention is illustrated by the following example in which all parts and percentages are by weight unless otherwise indicated.

EXAMPLE

A solution containing 5 parts of polybenzimidazole (poly,2,2'(metaphenylene)5,5'bibenzimidazole having an inherent viscosity of 0.9), 95 parts of dimethylacetamide is formed. 33.3 parts of this solution are mixed with two parts of divinylsulfone and two parts of benzyl trimethyl ammonium hydroxide. After 30 minutes a gel is formed. The gel is filtered and formed into a membrane which exhibits good reverse osmosis characteristics.

What is claimed is:

1. A process for crosslinking a polybenzimidazole polymer which compries reacting the polymer with a divinylsulfone.

2. The process of claim 1 wherein the polybenzimidazole polymer is dissolved in a solvent to form a solution and the divinylsulfone is added to said solution.

3. The process of claim 1 wherein the divinylsulfone is represented by the general formula:

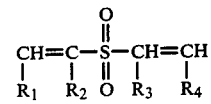

wherein $R_1$–$R_4$ are hydrogen or $C_1$–$C_3$ alkyl.

4. The process of claim 3 wherein $R_1$–$R_4$ are hydrogen.

5. The process of claims 1 or 2 wherein for each two equivalents of polybenzimidazole amine hydrogen to be crosslinked, one mole of divinylsulfone is added.

6. A process for crosslinking a polybenzimidazole polymer comprising treating the polymer with a divinylsulfone in the presence of a strong base catalyst wherein about one mole of divinylsulfone is added for each two equivalents of polybenzimidazole amine hydrogen to be crosslinked.

7. A process for crosslinking a polybenzimidazole polymer which comprises adding a divinylsulfone and a strong base catalyst to a solution comprised of a polybenzimidazole polymer and a solvent for the polymer wherein about one mole of divinylsulfone is added for each two equivalents of polybenzimidazole amine hydrogen to be crosslinked.

8. The process of claims 1 or 2, wherein said crosslinking reaction is carried out in the presence of a strong base catalyst.

9. The process of claims 6 or 7 wherein the base catalyst is selected from aryl alkyl ammonium hydroxides, alkali metal hydroxides, or alkali metal $C_1$–$C_6$ alkyl alkoxides.

10. The process of claims 1, 2, 6 or 7 wherein the polybenzimidazole polymer consists essentially of recurring units of the formula:

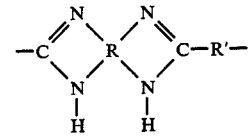

wherein R is a tetravalent aromatic nucleus, with the nitrogen atoms forming the benzimidazole rings paired upon adjacent carbon atoms of said automatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran.

11. The process of claims 1, 2, 6 or 7 wherein said polybenzimidazole polymer consists essentially of the recurring units of the formula:

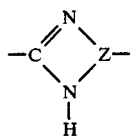

wherein Z is an aromatic nucleus having the nitrogen atoms forming the benzimidazole ring paired upon adjacent carbon atoms of the aromatic nucleus.

12. The process of claims 1, 2, 6 or 7 wherein said polybenzimidazole polymer is poly-2,2'-(m-phenylene)-5,5'-bibenzimidazole.

13. The process of claims 2 or 7 wherein the solvent for said polybenzimidazole polymer is selected from the group consisting of N,N-dimethylacetamide, N,N,-dimethyl formamide, dimethyl sulfoxide and N-methyl-2-pyrrolidone.

14. The process of claim 13 wherein the solvent is N,N-dimethylacetamide.

15. The process of claims 2 or 7 wherein the polybenzimidazole polymer is present in the solvent prior to crosslinking at a concentration of about 4 to about 30 percent by weight based upon the total weight of solution.

16. The process of claims 6 or 7 wherein said catalyst is benzyl trimethyl ammonium hydroxide.

17. A crosslinked polymeric composition comprising recurring units of the formula:

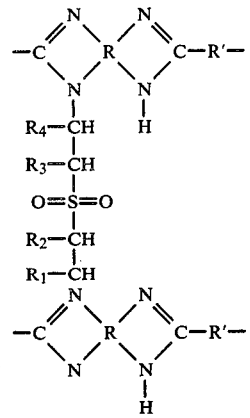

wherein R is a tetravalent aromatic nucleus with the nitrogen atoms forming benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran; and wherein $R_1$–$R_4$ are hydrogen or $C_1$–$C_3$ alkyl.

18. A crosslinked polymeric composition comprising reoccurring units of the formula:

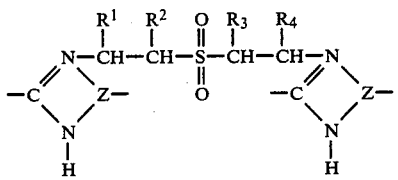

wherein Z is an aromatic nucleus having nitrogen atoms forming benzimidazole rings paired upon adjacent carbon atoms of the an aromatic nucleus; and wherein $R_1$–$R_4$ are hydrogen or $C_1$–$C_3$ alkyl.

19. The composition of claims 17 or 18 wherein $R_1$–$R_4$ are hydrogen.

20. The crosslinked polybenzimidazole product prepared by the process of claims 1, 2, 6 or 7.

* * * * *